US011662460B2

(12) United States Patent
Pinnock et al.

(10) Patent No.: US 11,662,460 B2
(45) Date of Patent: May 30, 2023

(54) DETECTING MISALIGNMENT

(71) Applicant: ZF AUTOMOTIVE UK LIMITED, Solihull (GB)

(72) Inventors: Robert Pinnock, Birmingham (GB); Roger Hazelden, Tamworth (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 320 days.

(21) Appl. No.: 16/646,586

(22) PCT Filed: Sep. 18, 2018

(86) PCT No.: PCT/GB2018/052651
§ 371 (c)(1),
(2) Date: Mar. 12, 2020

(87) PCT Pub. No.: WO2019/053473
PCT Pub. Date: Mar. 21, 2019

(65) Prior Publication Data
US 2020/0271776 A1   Aug. 27, 2020

(30) Foreign Application Priority Data
Sep. 18, 2017   (GB) .................................... 1714980

(51) Int. Cl.
*G01S 13/931*   (2020.01)
*G01S 7/40*   (2006.01)
*G01S 13/00*   (2006.01)

(52) U.S. Cl.
CPC .......... *G01S 13/931* (2013.01); *G01S 7/4026* (2013.01); *G01S 2013/9327* (2020.01)

(58) Field of Classification Search
CPC .......... G01S 13/931; G01S 2013/9327; G01S 7/4086
See application file for complete search history.

(56) References Cited

U.S. PATENT DOCUMENTS

| | | | |
|---|---|---|---|
| 2011/0273323 A1* | 11/2011 | Bays ...................... | G01S 13/585 342/104 |
| 2016/0266241 A1* | 9/2016 | Yukumatsu ............... | G01S 7/40 |
| 2017/0176586 A1* | 6/2017 | Johnson ................. | G01C 17/38 |

FOREIGN PATENT DOCUMENTS

| | | |
|---|---|---|
| JP | 2006349420 | 12/2006 |
| JP | 4097158 B2 * | 6/2008 |
| WO | 2008058787 | 5/2008 |
| WO | 2011048831 | 4/2011 |

* cited by examiner

*Primary Examiner* — Bernarr E Gregory
(74) *Attorney, Agent, or Firm* — Tarolli, Sundheim, Covell & Tummino LLP

(57) ABSTRACT

Apparatus for detecting misalignment of a radar unit (2; 22) of a vehicle (3; 23), the apparatus comprising: a magnet (1; 21), which may be a permanent magnet or an electromagnet, arranged to be mounted on the vehicle (3; 23) spaced from the radar unit (2; 22); a magnetic field sensor (4; 24), typically a three-axis magnetic field sensor, such as a Hall Effect Sensor, arranged to be coupled to the radar unit (2; 22) and having an output at which a signal indicative of the magnetic field at the magnetic field sensor (4; 24); and a processor (5; 25) coupled to the output and arranged to determine a misalignment of the radar unit (2; 22) based on the output of the magnetic field sensor (4; 24). Where the magnet is an electromagnet (21), the field strength of the electromagnet (21) can be varied by its drive circuit (30).

19 Claims, 3 Drawing Sheets

DETECTING MISALIGNMENT

RELATED APPLICATION

This application corresponds to PCT/GB2018/052651, filed Sep. 18, 2018, which corresponds to British Application No. 1714980.8, filed Sep. 18, 2017, the subject matter of which are incorporated herein by reference in their entirety.

This invention relates to apparatus and methods for detecting misalignment of a radar unit of a vehicle.

It is known to provide radar units in vehicles, particularly as part of systems such as adaptive cruise control and the like. Such systems have to be accurately aligned in the vehicle (as discussed, for example, in the PCT patent application published as WO2016/071696).

However, such systems can become misaligned following, for example, a minor crash event, especially when the "crash" occurs when the driver is not present, such as may happen when the parked vehicle is bumped into by another vehicle (e.g. in a car park or on-street parking situation). In such cases, using the current software-based processes for identifying radar sensor misalignment may mean that the vehicle is driven for some considerable distance before the radar is able to recalibrate itself, or the driver is warned that the system is faulty.

As such, it is desirable to be able to establish, within a few seconds of driving off from stand-still, when radar realignment/recalibration or driver warning is necessary.

We are aware of U.S. Pat. No. 9,366,751, which discloses a radar unit having an integral 3-axis accelerometer measuring longitudinal, lateral, and vertical linear accelerations. The acceleration measurements from the 3-accelerometer mounted in the radar unite are compared with those measured by a separate 3-axis accelerometer typically mounted at (or close to) the vehicle's centre of gravity. In ideal alignment conditions and with ideal accelerometer calibration, the accelerations measured by both accelerometers should match. In the presence of misalignment of the radar unit, one or more of the acceleration signals will not match between the two accelerometers.

When the degree of misalignment is not too great, an appropriate amount of alignment compensation can then be applied to the processed radar signals. For cases where the detected misalignment is greater than a threshold the radar sensor is disabled and a warning message is sent to the driver.

However, this system relies on the vehicle being in motion to work. One reason for this is that azimuthal (yaw) angular misalignment cannot be detected by a static 3-axis accelerometer (because the only acceleration acting on the accelerometer in the static case is that due to gravity, and the component of this acting on a laterally-aligned accelerometer axis is not changed by a purely azimuthal rotation). Hence, this type of misalignment requires the vehicle to be moving if a 3-axis accelerometer is used as the detection means.

According to a first aspect of the invention, there is provided apparatus for detecting misalignment of a radar unit of a vehicle, the apparatus comprising:
- a magnet arranged to be mounted on the vehicle spaced from the radar unit;
- a magnetic field sensor arranged to be coupled to the radar unit and having an output at which a signal indicative of the magnetic field at the magnetic field sensor; and
- a processor coupled to the output and arranged to determine a misalignment of the radar unit based on the output of the magnetic field sensor.

As such, providing a magnet which is to be coupled to the vehicle and a magnetic field sensor coupled to the radar unit allows the magnetic field sensor to detect changes in the magnetic field which indicate that the radar unit has moved relative to the vehicle. As such, a misalignment of the radar unit can be detected by determining changes in the magnetic field due to the magnet detected at the magnetic field sensor even in the case, for example, where the vehicle is stationary.

In one embodiment, the output is indicative of one scalar value of the magnetic field, such as the magnetic field strength or the component of the magnetic field in one direction. In such a case, the misalignment may comprise misalignment in one degree of freedom, typically one rotational degree of freedom. This is useful where the misalignment in two other degrees of freedom is available from other means (for example, the three-axis accelerometer described above).

In another embodiment, the output may be indicative of three components of the magnetic field; as such, the magnetic sensor may be a three-axis magnetic field sensor. In such a case, the misalignment may comprise three different degrees of freedom, typically rotational.

The magnet may be a permanent magnet. Alternatively, the magnet may comprise at least one electromagnet controlled by a control circuit. As such, the control circuit may be arranged to control the strength of each electromagnet.

The control circuit may be arranged to modulate the magnetic field strength with a modulation, and the processor may be arranged to detect the modulation in the magnetic field indicated by the output of the magnetic field sensor.

The control circuit may be arranged so as to only cause each electromagnet to generate a magnetic field when it is desired to determine a misalignment and not otherwise. For example, the control circuit may be arranged to only cause each electromagnet to generate a magnetic field when the vehicle is stationary, typically in a period immediately after an ignition of the vehicle is switched on.

There may be at least two spaced apart electromagnets. As such, especially where the control circuit is arranged to modulate the magnetic field strength, the processor can be arranged to triangulate the orientation and/or position of the radar unit relative to each electromagnet. Such a system may be useable to calibrate the position of the radar unit at the time of vehicle manufacture, so it may be possible to avoid any separate position calibration step at vehicle manufacture.

The processor may have an output at which a value indicative of the misalignment is provided.

In accordance with a second aspect of the invention, there is provided a vehicle having a radar unit and the apparatus of the first aspect of the invention attached thereto, in which the magnet is attached to the vehicle and the magnetic field sensor is attached to or integrated in the radar unit.

The vehicle may be provided with two accelerometers (typically three-axis accelerometers); one on the vehicle, typically at or about the centre of gravity of the vehicle, and another on the radar unit. As such, the apparatus of the first aspect of the invention can be used to provide the information relating to misalignment which would not be available from the accelerometers when the vehicle is at rest.

According to a third aspect of the invention, there is provided a method of detecting misalignment of a radar unit of a vehicle, the method comprising detecting, using a magnetic field sensor coupled to the radar unit, a magnetic field at the magnetic field sensor due to a magnet mounted on the vehicle and spaced from the radar unit; and determining a misalignment of the radar unit based on the detected magnetic field.

As such, providing a magnet which is to be coupled to the vehicle and a magnetic field sensor coupled to the radar unit allows the magnetic field sensor to detect changes in the magnetic field which indicate that the radar unit has moved relative to the vehicle. As such, a misalignment of the radar unit can be detected by determining changes in the magnetic field due to the magnet detected at the magnetic field sensor.

In one embodiment, magnetic field detected is indicative of one scalar value of the magnetic field, such as the magnetic field strength or the component of the magnetic field in one direction. In such a case, the misalignment may comprise misalignment in one degree of freedom, typically one rotational degree of freedom. This is useful where the misalignment in two other degrees of freedom is available from other means (for example, the three-axis accelerometer described above).

In another embodiment, the magnetic field detected may be indicative of three components of the magnetic field; as such, the magnetic sensor may be a three-axis magnetic field sensor. In such a case, the misalignment may comprise three different degrees of freedom, typically rotational.

The magnet may be a permanent magnet. Alternatively, the magnet may comprise at least one electromagnet. The method may comprise controlling the strength of each electromagnet.

The method may comprise modulating the magnetic field strength with a modulation, and typically detecting the modulation in the magnetic field indicated by the output of the magnetic field sensor.

The method may comprise only causing each electromagnet to generate a magnetic field when it is desired to determine a misalignment and not otherwise. For example, each electromagnet may only be caused to generate a magnetic field when the vehicle is stationary, typically in a period immediately after an ignition of the vehicle is switched on.

There may be at least two spaced apart electromagnets. As such, especially the magnetic field strength is modulated, the method may comprise triangulating the orientation and/or position of the radar unit relative to each electromagnet. Such a system may be useable to calibrate the position of the radar unit at the time of vehicle manufacture, so it may be possible to avoid any separate position calibration step at vehicle manufacture.

There now follows description of embodiments of the invention, described with reference to the accompanying drawings, in which:

FIGS. 1 to 4 show a first embodiment of the invention, which uses a permanent magnet 1 to generate a magnetic field against which to determine whether a radar unit 2 has been misaligned.

Figure 1:
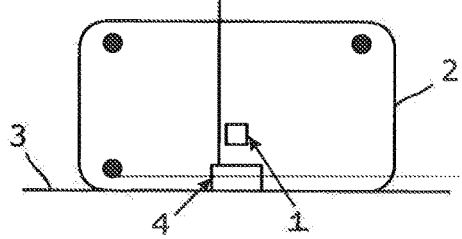
FIG. 1 is an elevation of a radar unit with a misalignment detection apparatus in accordance with a first embodiment of the invention.

In this embodiment, the permanent magnet 1 is attached to part of the vehicle 3 close to where the radar unit 2 is also attached to the same vehicle 3. Typically, the radar unit 2 will be carefully aligned relative to the vehicle 3 on manufacturing of the vehicle 3, with its position being calibrated. It is desirable to know, typically within a few seconds of starting the vehicle, before it is driven away, whether that careful positioning has been disturbed (e.g. by an impact).

As such, the radar unit comprises a magnetic field sensor 4. The magnetic field sensor is a three-axis sensor, such as a three-axis Hall Effect sensor. The output of this sensor gives the magnetic field strength along three axes, and is coupled to a processor 5.

Figure 3:
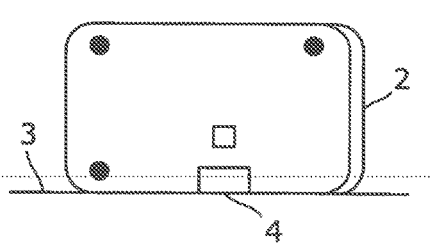
FIGS. 3 and 4 are corresponding views of the radar unit of FIG. 1 to which a misalignment has been applied.
Figure 2:
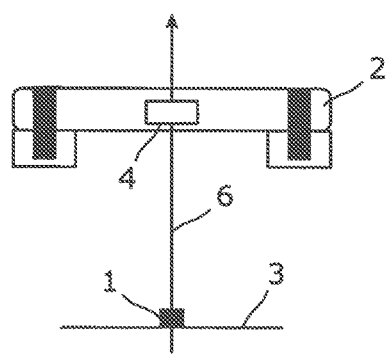
FIG. 2 is a plan view of the radar unit of FIG. 1.
Figure 4:
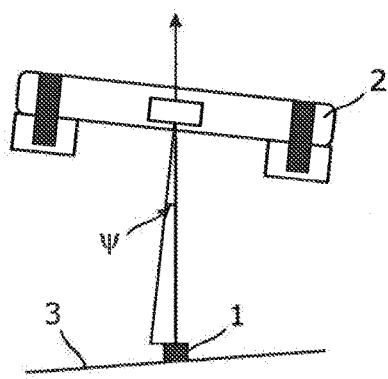
Figures 5, 7:
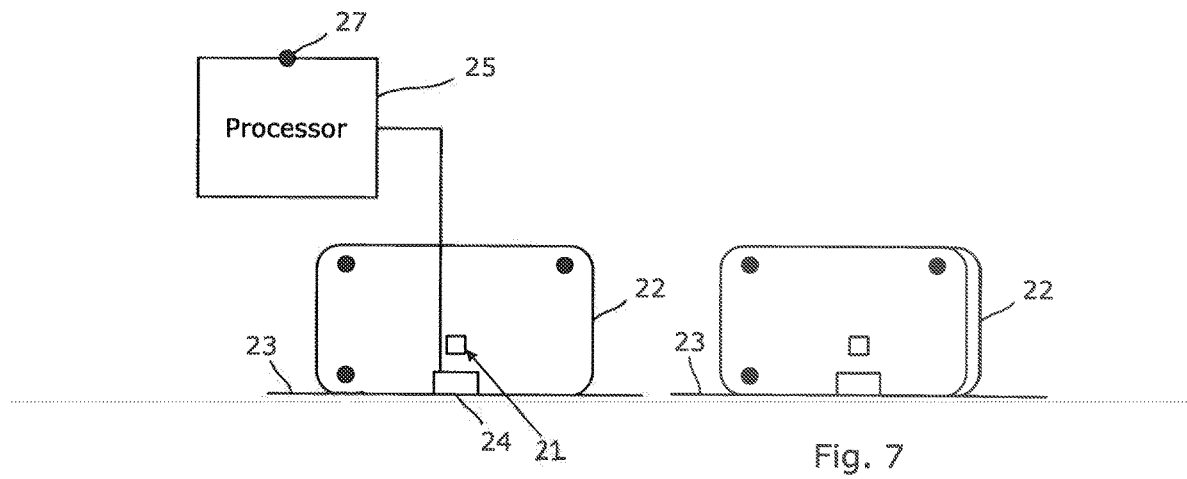
FIG. 5 is an elevation of a radar unit with a misalignment detection apparatus in accordance with a second embodiment of the invention.
FIGS. 7 and 8 are corresponding views of the radar unit of FIG. 5 to which a misalignment has been applied.
Figures 6, 8:
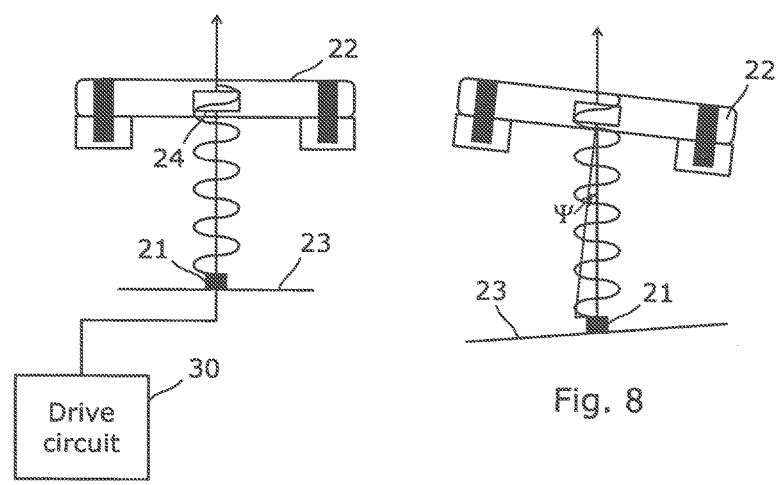
FIG. 6 is a plan view of the radar unit of FIG. 6.

The processor 5 is arranged to determine from the magnetic field strength along the three axes whether there has been any misalignment. This can be demonstrated by comparing FIGS. 1 and 2 of the accompanying drawings on the one hand, and FIGS. 3 and 4 on the other hand. In FIGS. 1 and 2, the radar unit 2 is in the original, correctly aligned position. In FIGS. 3 and 4, the radar unit 2 has been the subject of a yaw misalignment $\psi$ about a vertical axis. Such a misalignment is difficult if not impossible to determine using only accelerometers in a static vehicle.

In FIG. 2 of the accompanying drawings, it can be seen that an axis of the magnetic field aligned perpendicularly to the radar unit. As such, the direction of the magnetic field vector formed from the three axis measurements will be in a first direction. In FIG. 4 however, the magnetic field axis is offset by the misalignment angle $\psi$. As such, the magnetic field vector at the magnetic field sensor will shift with respect to that of FIGS. 1 and 2. The processor 5 can detect this shift, and provide an output 7 indicative of that misalignment. This can be done in a matter of seconds.

A second embodiment of the invention is shown in FIGS. 5 to 8 of the accompanying drawings. Equivalent items to those in the first embodiment are shown with matching reference numerals, raised by 20.

As before, a radar unit 22 is attached to a vehicle 23. However, rather than a permanent magnet as in the first embodiment, an electromagnet 21 is used, again attached to the vehicle 23 near to the radar unit 23. In this embodiment's simplest form, the electromagnet 21, driven by drive circuit 30, merely replicates the permanent magnet 1 of the first embodiment.

However, the use of an electromagnet 21 with a drive circuit 30 allows for more flexibility that the permanent magnet, where the magnetic field produced by the magnet is fixed. For example, the electromagnet may only be driven in the period when it is desirable to check for misalignment—for example in the few seconds after the vehicle 23 is started before it drives off. This means that there is little chance of the electromagnet 23 affecting the operations of any other part of the vehicle 23, as the electromagnet is only used for a very short period of time.

Additionally or alternatively, the magnetic field emitted by the electromagnet can be modulated. This has the advantage that it is then easier for the processor 25 to discriminate the magnetic field caused by the electromagnet 21 as against stray magnetic fields from other sources such as the vehicle's engine or the Earth's magnetic field, particularly if the drive circuit 30 and processor 25 are coupled such that the processor is aware of the modulation applied to the magnetic field.

Furthermore, the use of an electromagnet allows the magnetic field strength to be more easily varied than if a permanent magnet is employed; this can allow the field strength to be tailored so that it is sufficiently strong to overcome any other local magnetic fields being without saturating the magnetic field sensor.

As such, the processor 25 can still provide an output 27 being the misalignment of the vehicle.

Figure 9:
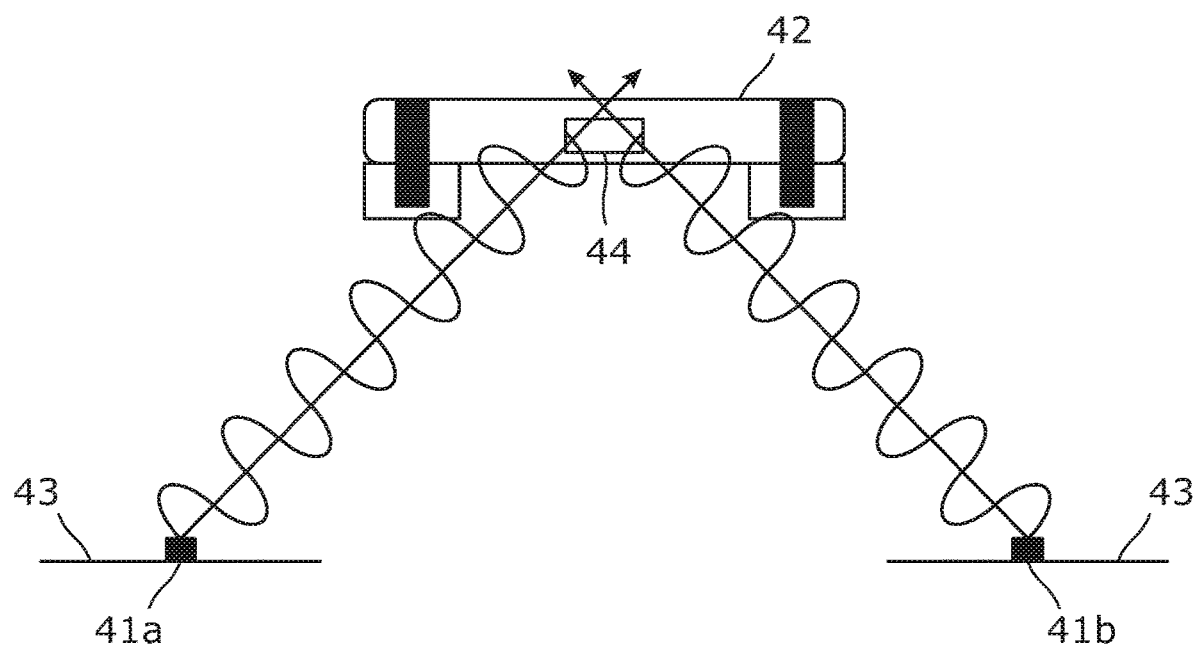
FIG. 9 is a plan view of a radar unit with a misalignment detection apparatus in accordance with a third embodiment of the invention.
Figure 10:
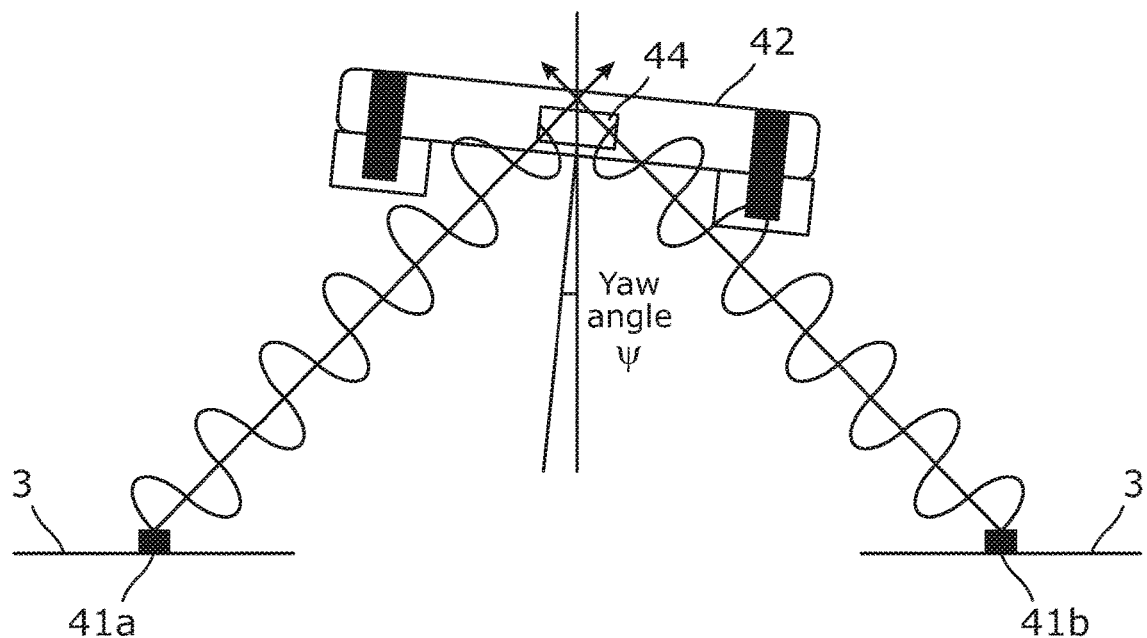
FIG. 10 is a plan view of the radar unit of FIG. 9 to which a misalignment has been applied.

A third embodiment of the invention is shown in FIGS. 9 and 10 of the accompanying drawings. Corresponding features to those of the second embodiment are shown with the same reference numerals, raised by 20.

This embodiment employs two electromagnets 41a, 41 in order to generate the magnetic field to be detected by the magnetic field sensor 44. The use of two electromagnets 41a, 41b, typically sequentially or by using different modulation, allows triangulation of the position of the radar unit 42 relative to the vehicle 43. As such, this arrangement could even be used in place of the manufacture-time calibration of the radar unit 42 position.

The invention claimed is:

1. Apparatus for detecting misalignment of a radar unit of a vehicle, the apparatus comprising:
 a magnet arranged to be mounted on the vehicle spaced from the radar unit;
 a magnetic field sensor arranged to be secured to a housing of the radar unit and movable therewith relative to the vehicle and having an output indicative of the magnetic field of the magnet; and
 a processor coupled to the magnetic field sensor and arranged to determine a misalignment of the housing of the radar unit based on the output of the magnetic field sensor.

2. The apparatus of claim 1, in which the output is indicative of one scalar value of the magnetic field, such as the magnetic field strength or the component of the magnetic field in one direction.

3. The apparatus of claim 1, in which the output is indicative of three components of the magnetic field.

4. The apparatus of claim 1, in which the magnet arranged to be mounted on the vehicle is a permanent magnet.

5. The apparatus of claim 1, in which the magnet arranged to be mounted on the vehicle comprises at least one electromagnet controlled by a control circuit to produce the magnetic field sensed by the magnetic field sensor.

6. The apparatus of claim 5, in which the control circuit is arranged to control the strength of each electromagnet.

7. The apparatus of claim 5, in which the control circuit is arranged to modulate the magnetic field strength with a modulation.

8. The apparatus of claim 7, in which the processor is arranged to detect the modulation in the magnetic field indicated by the output of the magnetic field sensor.

9. The apparatus of claim 5, in which the control circuit is arranged so as to only cause each electromagnet to generate a magnetic field when it is desired to determine a misalignment and not otherwise.

10. The apparatus of claim 9, in which the control circuit is arranged to only cause each electromagnet to generate a magnetic field when the vehicle is stationary, typically in a period immediately after an ignition of the vehicle is switched on.

11. The apparatus of claim 5, in which there are at least two spaced apart electromagnets.

12. The apparatus of claim 11, in which the processor is arranged to triangulate the orientation and/or position of the radar unit relative to each electromagnet.

13. The apparatus of claim 1, in which the processor has an output at which a value indicative of the misalignment is provided.

14. A vehicle having a radar unit and the apparatus of claim 1 attached thereto, in which the magnet is attached to the vehicle and the magnetic field sensor is attached to or integrated in the radar unit.

15. The vehicle of claim 14, provided with two accelerometers; one on the vehicle, and another on the radar unit.

16. A method of detecting misalignment of a radar unit of a vehicle, the method comprising detecting, using a magnetic field sensor secured to a housing of the radar unit and movable therewith relative to the vehicle, a magnetic field at the magnetic field sensor due to a magnet mounted on the vehicle and spaced from the radar unit; and determining a misalignment of a housing of the radar unit based on the detected magnetic field.

17. The method of claim 16, comprising modulating the magnetic field strength with a modulation, and typically detecting the modulation in the magnetic field indicated by the output of the magnetic field sensor.

18. The method of claim 16, wherein detecting the magnetic field at the magnetic field sensor occurs when the vehicle is stationary, typically in a period immediately after an ignition of the vehicle is switched on.

19. The method of claim 16, wherein detecting the magnetic field at the magnetic field sensor occurs while the vehicle is traveling in a straight line.

* * * * *